US011009847B2

(12) United States Patent
Kawanoue et al.

(10) Patent No.: US 11,009,847 B2
(45) Date of Patent: May 18, 2021

(54) CONTROLLER, CONTROL PROGRAM, AND CONTROL METHOD

(71) Applicant: OMRON Corporation, Kyoto (JP)

(72) Inventors: Shinsuke Kawanoue, Kyoto (JP); Yoshihide Nishiyama, Yokohama (JP)

(73) Assignee: OMRON Corporation, Kyoto (JP)

( * ) Notice: Subject to any disclaimer, the term of this patent is extended or adjusted under 35 U.S.C. 154(b) by 868 days.

(21) Appl. No.: 15/787,739

(22) Filed: Oct. 19, 2017

(65) Prior Publication Data
US 2018/0164770 A1 Jun. 14, 2018

(30) Foreign Application Priority Data
Dec. 14, 2016 (JP) .............................. JP2016-242303

(51) Int. Cl.
G05B 19/05 (2006.01)
G05B 13/02 (2006.01)
G05B 23/02 (2006.01)

(52) U.S. Cl.
CPC ......... G05B 19/058 (2013.01); G05B 13/028 (2013.01); G05B 23/024 (2013.01); G05B 2219/1105 (2013.01)

(58) Field of Classification Search
CPC ......... G05B 13/00–048; G05B 13/028; G05B 19/05–066; G06N 20/00; G06N 20/10
See application file for complete search history.

(56) References Cited

U.S. PATENT DOCUMENTS 10,193,780 B2 1/2019 Gopalakrishnan et al.
2003/0114965 A1 6/2003 Fiechter et al.
2005/0066241 A1 3/2005 Gross et al.
2007/0265713 A1 11/2007 Veillette et al.
(Continued)

FOREIGN PATENT DOCUMENTS

CN 102282516 A 12/2011
CN 103403633 A 11/2013
(Continued)

OTHER PUBLICATIONS

The Office Action dated Mar. 24, 2020 in a counterpart Chinese patent application.
(Continued)

Primary Examiner — Stanley K. Hill
(74) Attorney, Agent, or Firm — Metrolex IP Law Group, PLLC

(57) ABSTRACT

A controller includes a feature quantity generation unit that generates, from data associated with a control target, a feature quantity appropriate for detecting an abnormality in the control target, a machine learning unit that performs machine learning using the feature quantity, an abnormality detection unit that detects the abnormality based on an abnormality detection parameter determined from a learning result of the machine learning, and the feature quantity, an instruction unit that instructs the abnormality detection unit to detect the abnormality, and a data compression unit that compresses data about the feature quantity and provides the compressed data to the machine learning unit and the abnormality detection unit. The instruction unit transmits a request for detecting the abnormality to the abnormality detection unit. The abnormality detection unit detects the abnormality without returning a response to the request.

17 Claims, 13 Drawing Sheets

(56) References Cited

U.S. PATENT DOCUMENTS

| | | |
|---|---|---|
| 2011/0173497 A1 | 7/2011 | Nakatani et al. |
| 2012/0041575 A1 | 2/2012 | Maeda et al. |
| 2012/0290879 A1 | 11/2012 | Shibuya et al. |
| 2014/0012402 A1 | 1/2014 | Nishiyama et al. |
| 2016/0098037 A1 | 4/2016 | Zornio et al. |
| 2018/0164770 A1 | 6/2018 | Kawanoue et al. |

FOREIGN PATENT DOCUMENTS

| | | |
|---|---|---|
| JP | H2-2408 A | 1/1990 |
| JP | H6-52474 A | 2/1994 |
| JP | H11-175142 A | 7/1999 |
| JP | 2000-56823 A | 2/2000 |
| JP | 2010-9369 A | 1/2010 |
| JP | 2011-70635 A | 4/2011 |
| JP | 2011-145831 A | 7/2011 |
| JP | 2012-194663 A | 10/2012 |
| JP | 2012-194936 A | 10/2012 |
| JP | 2013-8111 A | 1/2013 |
| JP | 2013-25461 A | 2/2013 |
| JP | 2014-170269 A | 9/2014 |
| WO | 2016/189709 A1 | 12/2016 |

OTHER PUBLICATIONS

The International search report (ISR) dated Feb. 20, 2018 in a related patent application.

The Japanese office action (JPOA) dated Aug. 21, 2018 in a counterpart Japanese patent application.

The extended European search report dated Apr. 9, 2018 in a corresponding European Patent application.

The U.S. Office Action including PTO-892 dated Oct. 22, 2020 in a related U.S. Appl. No. 16/461,011.

Office Action (JPOA) dated Dec. 15, 2020 in a counterpart Japanese patent application.

Notice of Allowance dated Mar. 4, 2021 in a related U.S. Appl. No. 16/461,011.

FIG. 8

| Target data | Area | Change in behavior | | Feature quantity name |
|---|---|---|---|---|
| Single data piece | Time area | Change in median value | 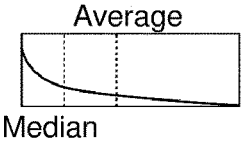 | Median value |
| Single data piece | Time area | Change in difference | x − y | Difference |
| Single/multiple data piece(s) | Time area | Change in ratio | x/y | Ratio |
| Single/multiple data piece(s) | Time area | Change in duty ratio |  | Duty ratio |
| Single data piece | Time area | Change in maximum value |  | Maximum value |
| Single data piece | Time area | Change in minimum value | 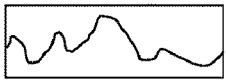 | Minimum value |
| Multiple data pieces | Time area | Greater shift in synchronization (multiaxial) |  | Synchronization shift (multiaxial)_pulse |
| | | Greater shift in synchronization (biaxial) | 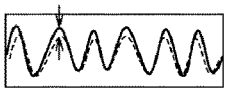 | Synchronization shift (biaxial)_periodicity |
| Multiple data pieces | Time area | Change in correlation value |  | Correlation value |
| Multiple data pieces | Time area | Change in Mahalanobis' distance |  | Mahalanobis' distance |
| Multiple data pieces | Time area | Change in jackknife distance | $J_i = \sqrt{\frac{(n-1)n^2}{(n-1)n^3} \times \frac{M_i^2}{1-\frac{M_i}{(n-1)n^2}}}$ | Jackknife distance |
| Single data piece | Time area | Change in quartile | 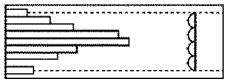 | Quartile |
| Single data piece | Time area | Wider variation in period | 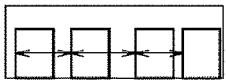 | Period variation |

| Cluster | Number of data pieces | Average | Standard deviation |
|---|---|---|---|
| 1 | 1585 | 75 | 3.55 |
| 2 | 875 | 20 | 5.25 |
| 3 | 952 | 95 | 2.05 |

134

Input data

{"val1": 9,
 "val2": 15,
 "val3": 30,
 ...         }

After serialization

⟹ (cox82de9055u·········)

CONTROLLER, CONTROL PROGRAM, AND CONTROL METHOD

CROSS REFERENCE TO RELATED APPLICATIONS

This application claims priority from prior Japanese Patent Application No. 2016-242303 filed with the Japan Patent Office on Dec. 14, 2016, the entire contents of which are incorporated herein by reference.

FIELD

The present disclosure relates to a controller, a control program, and a control method for monitoring a phenomenon occurring in a control target.

BACKGROUND

Factory automation (FA) technology involving controllers, such as programmable logic controllers (PLCs), is widely used at various production sites. The recent development of information and communication technology (ICT) has increased the performance and functionality of such controllers used in the field of factory automation.

The increased performance includes shortened cycles of data input in and output from a controller. For example, Japanese Unexamined Patent Application Publication No. 2012-194663 (Patent Literature 1) describes a technique for allowing a central processing unit (CPU) of a PLC to output and receive control data in fixed communication cycles shorter than the maximum execution duration of a control program.

The shortened cycles of data input and output enable higher accuracy of, for example, control, monitoring, abnormality detection, and abnormality prediction.

Japanese Unexamined Patent Application Publication No. 2013-008111 (Patent Literature 2) describes an abnormal symptom diagnosis apparatus that diagnoses a machine for abnormal symptoms. The abnormal symptom diagnosis apparatus described in Patent Literature 2 uses multidimensional sensor data obtained by multiple sensors in machines and transmitted from each machine through a communication network. The abnormal symptom diagnosis apparatus diagnoses abnormal symptoms by, for example, data mining on the multidimensional sensor data.

CITATION LIST

Patent Literature

Patent Literature 1: Japanese Unexamined Patent Application Publication No. 2012-194663
Patent Literature 2: Japanese Unexamined Patent Application Publication No. 2013-008111

SUMMARY

Technical Problem

Although the technique described in Patent Literature 1 allows input data to be obtained at high speed, this technique cannot be used in the abnormal symptom diagnosis apparatus described in Patent Literature 2. This is because the multidimensional sensor data used by the abnormal symptom diagnosis apparatus in Patent Literature 2 is transmitted through a communication network such as a local area network (LAN) or a wide area network (WAN), for which collecting input data in periods of the orders of milliseconds or microseconds is difficult.

Thus, the abnormal symptom diagnosis apparatus described in Patent Literature 2 can only diagnose abnormal symptoms caused by relatively slow deterioration.

One or more aspects are directed to a technique for enabling shorter-cycle monitoring of a phenomenon occurring in a control target.

Solution to Problem

One aspect provides a controller for controlling a control target. The controller includes a feature quantity generation unit that generates, from data associated with the control target, a feature quantity appropriate for detecting an abnormality in the control target, a machine learning unit that performs machine learning using the feature quantity generated by the feature quantity generation unit, an abnormality detection unit that detects the abnormality in the control target based on an abnormality detection parameter determined from a learning result of the machine learning used for detecting the abnormality, and based on the feature quantity generated by the feature quantity generation unit, an instruction unit that instructs the abnormality detection unit to detect the abnormality, and a data compression unit that compresses data about the feature quantity generated by the feature quantity generation unit and provide the compressed data to the machine learning unit and the abnormality detection unit. The instruction unit transmits a request for detecting the abnormality to the abnormality detection unit, and the abnormality detection unit detects the abnormality without returning a response to the request to the instruction unit.

In some embodiments, the data compression unit converts target data into machine code.

In some embodiments, the abnormality detection unit is implemented by a user program including specification of the abnormality detection parameter and specification of the target feature quantity.

In some embodiments, the controller further includes a database that collects and store data associated with the control target.

In some embodiments, the database stores data specified in accordance with an instruction included in a user program.

In some embodiments, the controller further includes a determination unit that determines, based on the data stored in the database, a feature quantity generation technique appropriate for detecting the abnormality in the control target.

In some embodiments, the controller further includes an abnormality detection parameter determination unit that determines the abnormality detection parameter based on the learning result of the machine learning.

In some embodiments, the controller further includes a storing unit that stores the abnormality detection parameter, and update the stored abnormality detection parameter in response to a request from an external device.

Another aspect provides a control program executable by a computer to implement a controller for controlling a control target. The control program enables the computer to implement generating, from data associated with the control target, a feature quantity appropriate for detecting an abnormality in the control target, performing machine learning using the generated feature quantity, detecting the abnormality in the control target based on an abnormality detection parameter determined from a learning result of the machine learning used for detecting the abnormality, and based on the generated feature quantity, instructing to detect the abnormality, and compressing data about the generated feature quantity and providing the data used for the machine learning and the abnormality detection. Detecting the abnormality includes detecting the abnormality without returning a response to a transmitted request for detecting the abnormality.

A further aspect provides a control method used by a controller for controlling a control target. The method includes generating, from data associated with the control target, a feature quantity appropriate for detecting an abnormality in the control target, performing machine learning using the generated feature quantity, detecting the abnormality in the control target based on an abnormality detection parameter determined from a learning result of the machine learning used for detecting the abnormality, and based on the generated feature quantity, instructing to detect the abnormality, and compressing data about the generated feature quantity and providing the data used for the machine learning and the abnormality detection. Detecting the abnormality includes detecting the abnormality without returning a response to a transmitted request for detecting the abnormality.

Advantageous Effects

The technique according to one or more aspects enable shorter-cycle monitoring of a phenomenon occurring in a control target.

BRIEF DESCRIPTION OF THE DRAWINGS

FIG. 8 is a table illustrating the feature quantities that can be determined in data mining performed in a control system according to one or more embodiments.

DETAILED DESCRIPTION

Figure 1:
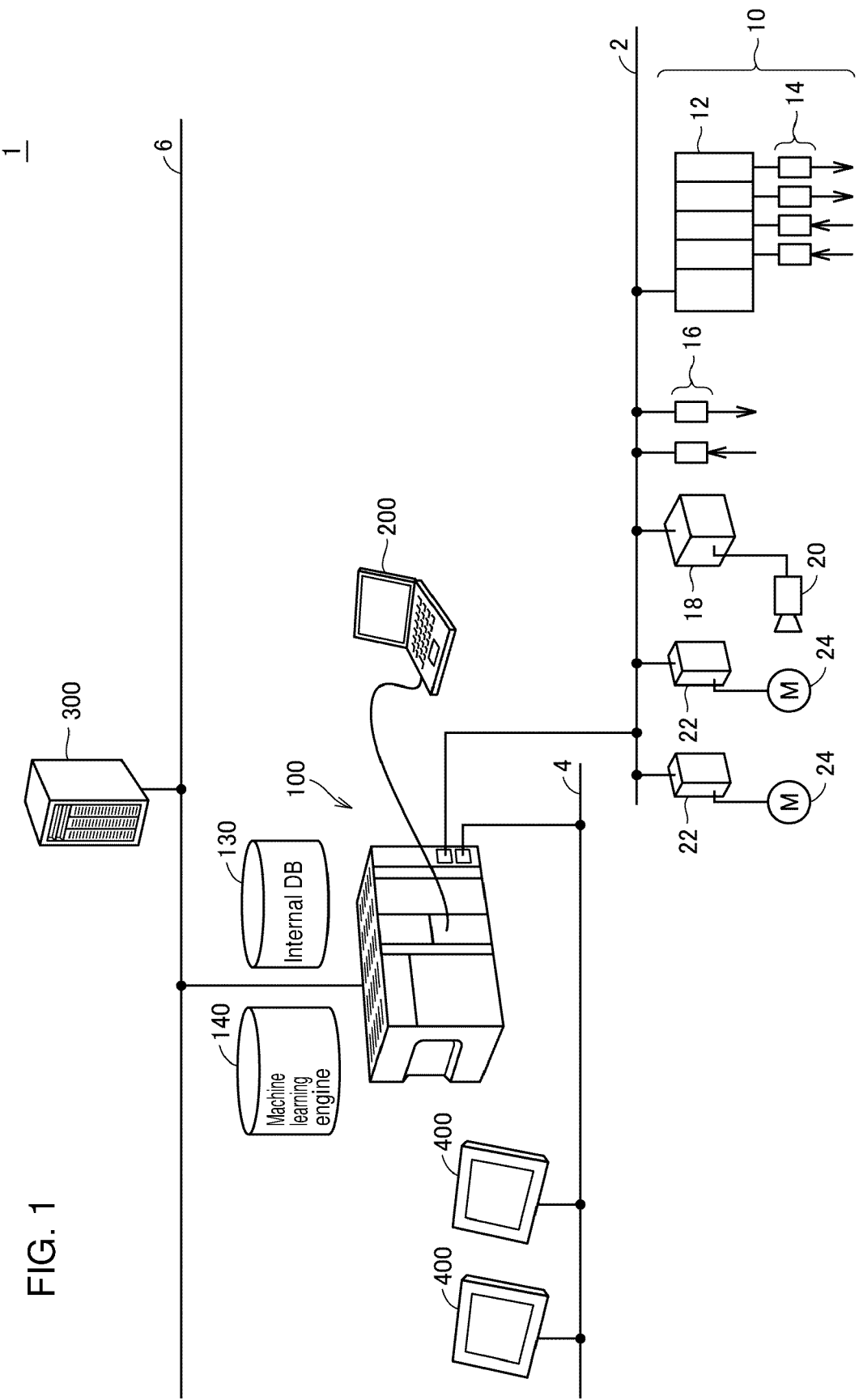
FIG. 1 is a schematic diagram illustrating the overall configuration of a control system according to one or more embodiments.

Embodiments will now be described with reference to the drawings. The same or corresponding components in the figures are given the same reference numerals, and will not be described repeatedly.

A. Overall Configuration of Control System

The overall configuration of a control system 1 including a controller according to one or more embodiments will now be described.

FIG. 1 is a schematic diagram showing the overall configuration of the control system 1 according to one or more embodiments. As shown in FIG. 1, the control system 1 according to one or more embodiments includes a controller 100 for controlling a control target, and a support apparatus 200 connected to the controller 100 as its main components.

The controller 100 may be a computer such as a programmable logic controller (PLC). The controller 100 is connected to a field device group 10 with a first field network 2 and to one or more displays 400 with a second field network 4. The controller 100 is also connected to a data logging device 300 with a local network 6. The controller 100 transmits and receives data to and from each connected device using the corresponding network. The data logging device 300 and the display 400 are optional and not essential in the control system 1.

The controller 100 includes a control logic (or a PLC engine) that performs various computations for controlling equipment and machines. In addition to the PLC engine, the controller 100 includes a component that provides a data collection function, or collecting data obtained by the field device group 10 and transferred to the controller 100 (hereafter, input data), and further a component that provides a monitoring function, or monitoring the collected input data. These functions implemented in the controller 100 enable shorter-cycle monitoring of a phenomenon occurring in a control target.

More specifically, the controller 100 includes an internal database (DB) 130 that provides the data collection function, and a machine learning engine 140 that provides the monitoring function. The internal DB 130 and the machine learning engine 140 will be described in detail later.

The first field network 2 and the second field network 4 may be networks that allow fixed-cycle communication that assures data arrival times. Examples of such networks allowing fixed-cycle communication include EtherCAT (registered trademark), EtherNet/IP (registered trademark), DeviceNet (registered trademark), and CompoNet (registered trademark).

The field device group 10 includes devices for collecting input data from a control target or a manufacturing apparatus and a production line associated with control (hereinafter collectively referred to as a field). The devices for collecting input data may include an input relay and various sensors. The field device group 10 also includes devices for acting on the field in a certain manner in response to a command (or output data) provided from the controller 100. The devices for acting on the field may include an output relay, a contactor, a servo driver, a servomotor, and any actuator. The field device group 10 transmits and receives data including input data and output data to and from the controller 100 through the first field network 2.

In the configuration shown in FIG. 1, the field device group 10 includes a remote input/output (I/O) device 12, a relay group 14, an image sensor 18 with a camera 20, and servo drivers 22 each with a servomotor 24.

The remote I/O device 12 includes a communication unit that allows communication with the first field network 2, and an input and output (I/O) unit for obtaining input data and outputting output data. The I/O unit allows communication of input data and output data between the controller 100 and the field. In the example of FIG. 1, digital signals are transmitted as input data and output data through the relay group 14.

The I/O unit may be directly connected to the field network. In the example shown in FIG. 1, I/O units 16 are directly connected to the first field network 2.

The image sensor 18 performs image measurement such as pattern matching on image data obtained by the camera 20, and transmits the measurement results to the controller 100.

The servo driver 22 drives the servomotor 24 in accordance with output data (e.g., a position command) from the controller 100.

The data transmitted and received between the controller 100 and the field device group 10 with the first field network 2 as described above is updated in short periods of the orders of hundreds of microseconds to tens of milliseconds. The update process for such transmitted and received data may be referred to as I/O refresh.

The display 400 connected to the controller 100 with the second field network 4 receives a user operation, and transmits a command corresponding to the user operation to the controller 100. The display 400 also graphically shows the computation results obtained from the controller 100.

The data logging device 300 is connected to the controller 100 with the local network 6, and transmits and receives intended data to and from the controller 100. The data logging device 300 is connected to the controller 100 with the local network 6, and transmits and receives intended data to and from the controller 100. The data logging device 300 has, for example, a database function, and chronologically collects event logs created by the controller 100. The local network 6 may have a general-purpose protocol, such as Ethernet (registered trademark). Typically, the local network 6 may use a data transmission cycle or a data update cycle longer than the data transmission cycle or the data update cycle used in the field networks (the first field network 2 and the second field network 4). However, the local network 6 may allow transmission of more data at a time than the field networks.

The support apparatus 200 supports the preparations of the controller 100 for controlling a control target. More specifically, the support apparatus 200 provides, for example, a development environment (including a programming and program editing tool, a parser, and a compiler) for programs to be executed in the controller 100, a setting environment for setting the parameters (configurations) of the controller 100 and various devices connected to the controller 100, the function of transmitting a generated user program to the controller 100, and the function of online correction and modification of a user program executed on the controller 100.

Additionally, the support apparatus 200 according to one or more embodiments has the setting functions for the internal DB 130 and the machine learning engine 140 implemented in the controller 100. The functions will be described later.

B. Hardware Configurations of Apparatuses

The hardware configurations of the main apparatuses included in the control system 1 according to one or more embodiments will now be described.

b1: Hardware Configuration of Controller 100

Figure 2:
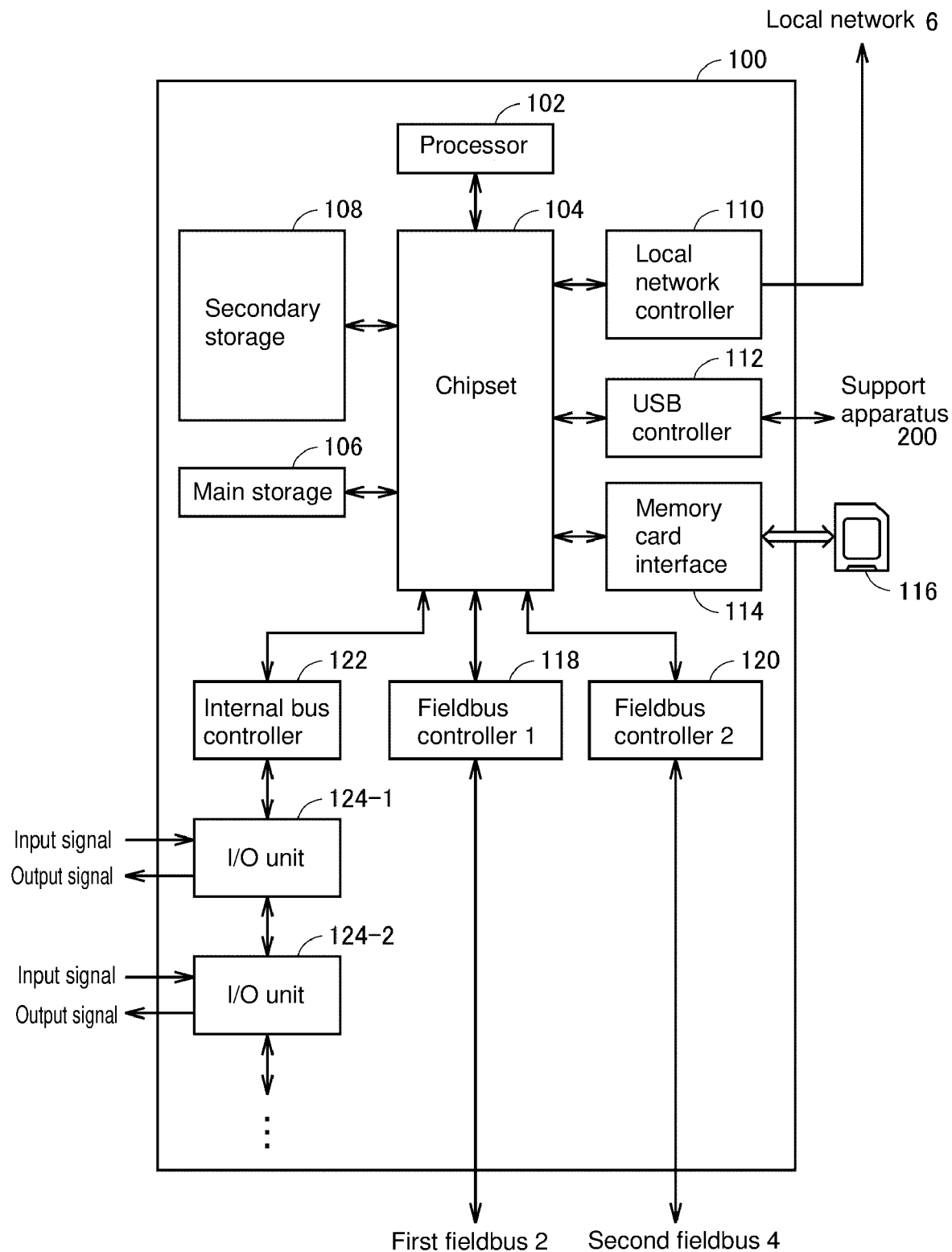
FIG. 2 is a block diagram illustrating the hardware configuration of a controller included in a control system according to one or more embodiments.

FIG. 2 is a block diagram showing the hardware configuration of the controller 100 included in the control system 1 according to one or more embodiments. As shown in FIG. 2, the controller 100 includes a processor 102, such as a central processing unit (CPU) or a micro-processing unit (MPU), a chipset 104, a main storage 106, a secondary storage 108, a local network controller 110, a universal serial bus (USB) controller 112, a memory card interface 114, an internal bus controller 122, fieldbus controllers 118 and 120, and I/O units 124-1, 124-2, and subsequent I/O units.

The processor 102 reads various programs stored in the secondary storage 108, and expands the programs in the main storage 106 and executes the programs to implement control for the control target and various types of processing described later. The chipset 104 controls the processor 102 and each device to implement the overall processing performed by the controller 100.

The secondary storage 108 stores system programs for implementing the PLC engine as well as user programs executed using the PLC engine. The secondary storage 108 also stores programs for implementing the internal DB 130 and the machine learning engine 140.

The local network controller 110 controls data communication with other devices through the local network 6. The USB controller 112 controls data communication with the support apparatus 200 through USB connection.

The memory card interface 114 can receive a removable memory card 116. The memory card interface 114 allows data to be written to the memory card 116, and various data (e.g., user programs and trace data) to be read from the memory card 116.

The internal bus controller 122 is an interface that allows data communication with the I/O units 124-1, 124-2, and other I/O units incorporated in the controller 100.

The fieldbus controller 118 controls data communication with another device through the first field network 2. Similarly, the fieldbus controller 120 controls data communication with another device through the second field network 4.

Although FIG. 2 shows the configuration in which program execution by the processor 102 provides each intended function, some or all of these functions may also be implemented with dedicated hardware circuits (e.g., application-specific integrated circuits or ASICs, or field-programmable gate array or FPGAs). In some embodiments, the main part of the controller 100 may be implemented with hardware having a general-purpose architecture (e.g., an industrial personal computer based on a general-purpose personal computer). In that case, multiple operating systems (OSes) for different uses may be executed in parallel using a virtualization technique, and an intended application may be executed on each OS.

b2: Hardware Configuration of Support Apparatus 200

The support apparatus 200 according to one or more embodiments is implemented by, for example, executing programs on hardware having a general-purpose architecture (e.g., a general-purpose personal computer).

Figure 3:
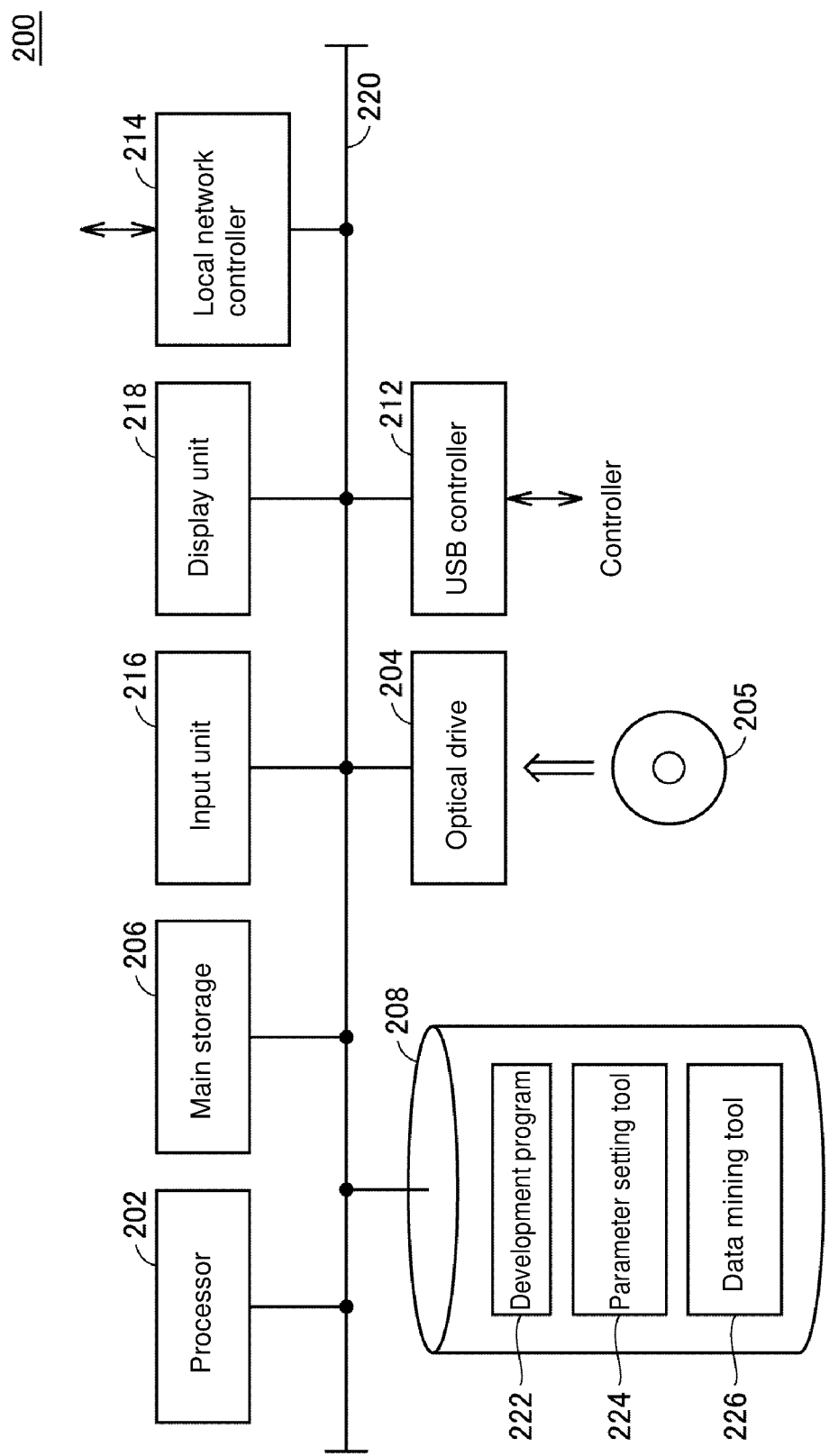
FIG. 3 is a block diagram illustrating the hardware configuration of a support apparatus included in a control system according to one or more embodiments.

FIG. 3 is a block diagram showing the hardware configuration of the support apparatus 200 included in the control system 1 according to one or more embodiments. As shown in FIG. 3, the support apparatus 200 includes a processor 202, such as a CPU or an MPU, an optical drive 204, a main storage 206, a secondary storage 208, a USB controller 212, a local network controller 214, an input unit 216, and a display unit 218. These components are connected to one another with a bus 220.

The processor 202 reads various programs stored in the secondary storage 208, expands the programs in the main storage 206 and executes the programs to implement various types of processing described later.

The secondary storage 208 is, for example, a hard disk drive (HDD) or a flash solid state drive (SSD). The secondary storage 208 typically stores a development program 222 for creating a user program to be executed in the support apparatus 200, debugging the created program, defining the system configuration, and setting various parameters, a parameter setting tool 224 for setting variables for machine learning, and a data mining tool 226 for extracting intended information from the data collected by the controller 100. The secondary storage 208 may store an OS and other programs as appropriate.

The optical drive 204 included in the support apparatus 200 reads a program from a computer-readable recording medium 205 (e.g., an optical recording medium such as a digital versatile disc, or a DVD) in which programs are stored in a non-transitory manner. The read program is installed in, for example, the secondary storage 208.

Various programs executed in the support apparatus 200 may be installed from the computer-readable recording medium 205 or may be downloaded from a server on a network and installed. The function provided by the support apparatus 200 according to one or more embodiments may be implemented using a part of a module provided by the OS.

The USB controller 212 controls data communication with the controller 100 through USB connection. The local network controller 214 controls data communication with another device through any network.

The input unit 216 includes a keyboard and a mouse, and receives a user operation. The display unit 218 includes a display, various indicators, and a printer, and outputs the processing results from the processor 202 and other information.

Although FIG. 3 shows the configuration in which the functions are implemented by program execution by the processor 202 as appropriate, some or all of these functions may also be implemented with dedicated hardware circuits (e.g., ASICs or FPGAs).

b3: Hardware Configuration of Data Logging Device 300

The data logging device 300 included in the control system 1 according to one or more embodiments may be, for example, a general-purpose file server or a general-purpose database server. The hardware configuration of the device is known, and will not be described in detail.

b4: Hardware Configuration of Display 400

The display 400 included in the control system 1 according to one or more embodiments is a human-machine interface (HMI) device. The display 400 may have a dedicated configuration or may be implemented with hardware having a general-purpose architecture (e.g., an industrial personal computer based on a general-purpose personal computer).

C. Abnormality Detection Function Provided by Control System

An abnormality detection function provided by the control system 1 according to one or more embodiments will now be described.

Figure 4:
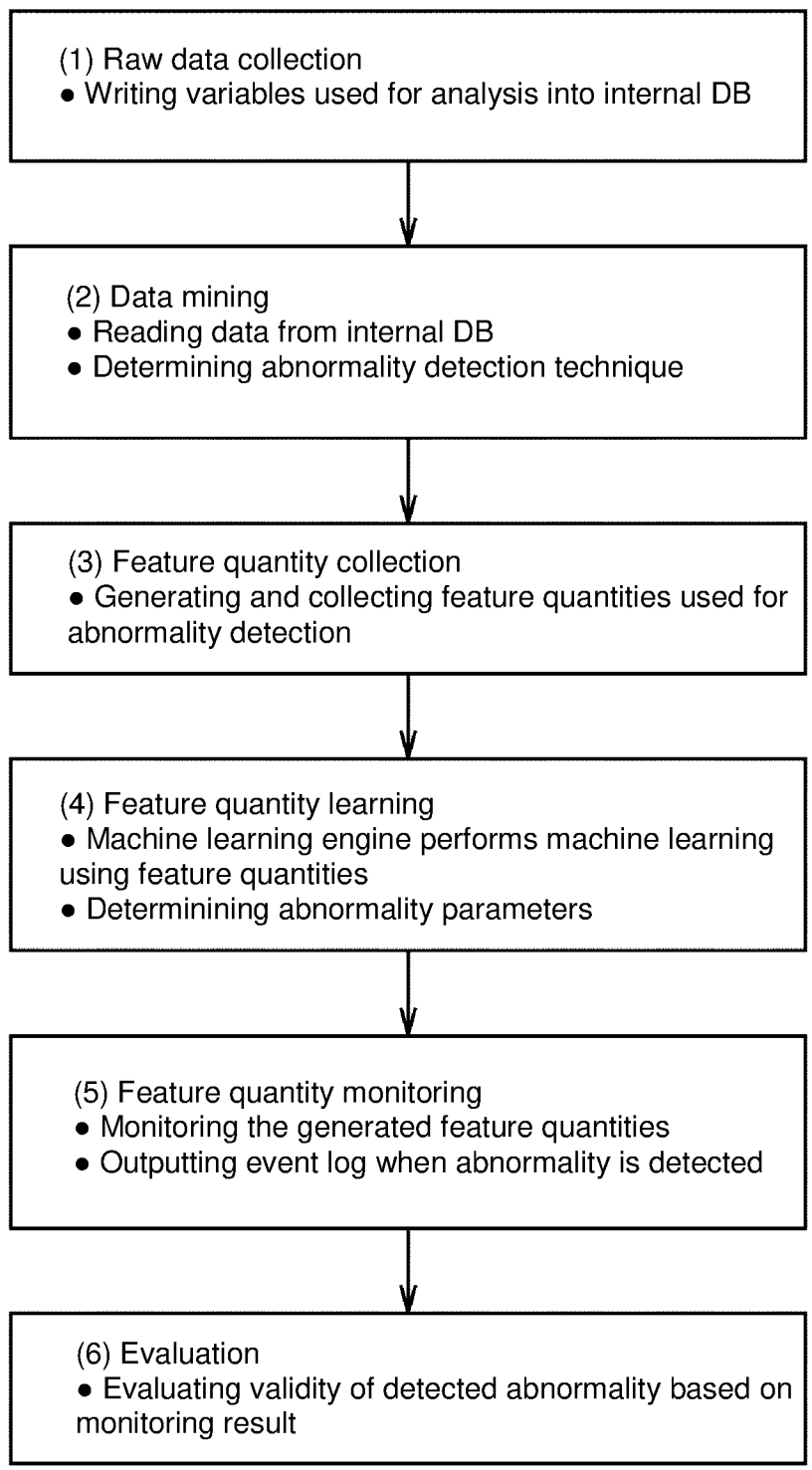
FIG. 4 is a schematic diagram illustrating an abnormality detection procedure performed in a control system according to one or more embodiments.

FIG. 4 is a schematic diagram showing an abnormality detection procedure performed in the control system 1 according to one or more embodiments. The entire abnormality detection procedure shown in FIG. 4 includes six processes.

More specifically, raw data collection (1) is performed first. In the raw data collection (1), data to be used for abnormality detection analysis is selected from the data handled by the controller 100 and is written into the internal DB 130. The raw data collection (1) is performed by executing an internal DB write program (described later) of the controller 100.

In the controller 100, each piece of data transmitted and received to and from the field (input data and output data) and the internal data has the corresponding unique variable identifier. Each variable identifier is used to write a user program. More specifically, the controller 100 provides an environment for programming with variables. Thus, specifying a variable or identifying a variable herein is substantially synonymous with identifying target data. The technical scope of the present invention is not limited to an architecture that allows programming with variables, and may also include an architecture that allows direct specification of an address in memory.

Subsequently, data mining (2) is performed. In the data mining (2), data written in the internal DB 130 is read, and an abnormality detection technique is determined. The abnormality detection technique indicates the type of data to be monitored and the logic to be used for monitoring the data to detect a target abnormality. In one or more embodiments, the abnormality detection technique includes feature quantity generation from one or more data items obtained from the field. The data mining (2) is typically implemented by executing the data mining tool (described later) of the support apparatus 200. Depending on the determined abnormality detection technique, the settings and parameters for generating the feature quantities are output.

Subsequently, feature quantity collection (3) is performed. In the feature quantity collection (3), the feature quantity generation technique determined in the data mining (2) is used for the target data selected from the data transmitted and received to and from the field and from the internal data. The feature quantity generating technique is used to generate the feature quantities sequentially. The feature quantity collection (3) is performed by executing a feature quantity generation program (described later) in the controller 100.

Subsequently, feature quantity learning (4) is performed. In the feature quantity learning (4), the feature quantities collected in the feature quantity collection (3) undergo machine learning. Based on the results from machine learning, the abnormality detection parameters (typically, a threshold) to be used for abnormality detection are determined. The feature quantity learning (4) is provided by the machine learning engine (described later) included in the controller 100.

Through the processes (1) to (4) described above, the system can determine the feature quantities used for abnormality detection, as well as the abnormality detection parameters used for detecting an abnormality. These processes are followed by monitoring for an abnormality. More specifically, feature quantity monitoring (5) is performed. In the feature quantity monitoring (5), the feature quantities generated in each predetermined cycle or for each predetermined event are monitored to determine whether the generated feature quantities meet the conditions defined based on the predetermined abnormality detection parameters. When an abnormality is detected, the device is switched in accordance with the detected abnormality, and an event log indicating the detected abnormality is output.

When any abnormality is detected in the feature quantity monitoring (5), its validity may be evaluated. In other words, detecting any abnormality may be followed by evaluation (6). In the evaluation (6), the validity of the detected abnormality is evaluated based on the abnormality detection result. The evaluation (6) is typically implemented by executing the data mining tool of the support apparatus 200. The data mining tool will be described later. The abnormality detection parameters used for the abnormality detection may be modified based on the evaluation result obtained in the evaluation (6).

Figure 5:
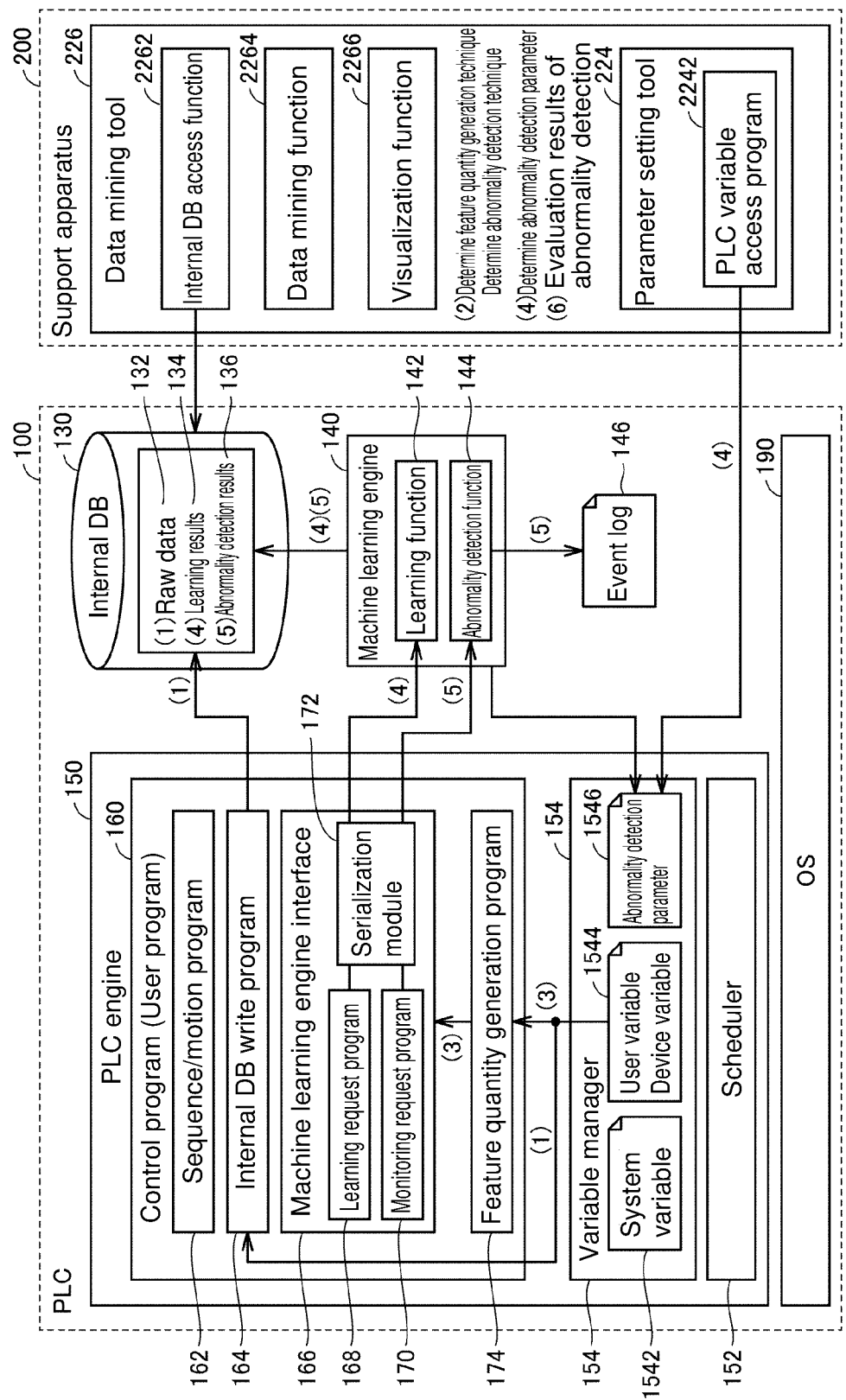
FIG. 5 is a schematic diagram illustrating the functions provided by the components of to control system according to one or more embodiments.

FIG. 5 is a schematic diagram describing the functions provided by the components of the control system 1 according to one or more embodiments. In the schematic diagram of FIG. 5, the numbers in parentheses indicate the processing in the corresponding processes (1) to (6) shown in FIG. 5.

The controller 100 includes a PLC engine 150, in addition to the internal DB 130 and the machine learning engine 140. These functions are basically implemented by the processor 102 included in the controller 100 (FIG. 2) executing programs. The controller 100 incorporates an OS 190 installed to provide the environment for the processor 102 to execute the programs.

The PLC engine 150 is typically provided by system programs and user programs being executed on the OS 190. More specifically, one aspect includes programs executed on a computer to implement the controller 100 including the PLC engine 150.

More specifically, the PLC engine 150 includes a scheduler 152, a variable manager 154, and a control program 160.

The scheduler 152 controls the timing and the order of execution of each program (or the corresponding task) included in the PLC engine 150. Each task included in the PLC engine 150 has a predetermined execution cycle. The scheduler 152 provides control to allow repeated execution of the task in every predetermined execution cycle.

The variable manager 154 manages, as variables, data updated by I/O refresh, which is periodically performed in the PLC engine 150. More specifically, the variable manager 154 stores and manages system variables 1542 including a data set indicating the operation states of the components of the controller 100, user variable/device variables 1544 including a data set read and written by the user program executed in the PLC engine 150, and abnormality detection parameters 1546 used for abnormality detection.

The abnormality detection parameters 1546 can be accessed and updated by a PLC variable access program 2242 in the support apparatus 200. More specifically, the variable manager 154 stores the abnormality detection parameters 1546, and provides the function of updating the stored abnormality detection parameters 1546 in response to a request from an external device.

The control program 160 corresponds to a user program that can be freely created by a user, and typically includes a sequence/motion program 162, an internal DB write program 164, a machine learning engine interface 166, and a feature quantity generation program 174. The program instructions for the control program 160 may be written in an integrated program or in separate programs.

The sequence/motion program 162 includes logical operation instructions and/or arithmetic operation instructions for controlling a control target. The internal DB write program 164 writes a predetermined one of the variables included in the user variable/device variables 1544 into the internal DB 130.

The machine learning engine interface 166 includes instructions for operating the machine learning engine 140. More specifically, the machine learning engine interface 166 includes a learning request program 168, a monitoring request program 170, and a serialization module 172.

More specifically, the learning request program 168 includes instructions to cause the machine learning engine 140 to perform machine learning. The monitoring request program 170 includes instructions to cause the machine learning engine 140 to monitor a feature quantity using the abnormality detection parameters 1546 and detect an abnormality.

The serialization module 172 performs serialization to reduce the communication traffic between the machine learning engine 140 and the learning request program 168 and between the machine learning engine 140 and the monitoring request program 170. As described later, the serialization module 172 compresses data for the feature quantity generated by executing the feature quantity generation program 174 and provides the compressed data to a learning function 142 and an abnormality detection function 144.

The feature quantity generation program 174 includes instructions each for generating the feature quantity using specified variables from the user variable/device variables 1544 with the predetermined feature quantity generation technique. As described later, an appropriate feature quantity generation technique is determined depending on the control target. More specifically, the feature quantity generation program 174 generates, from the data associated with a control target, the feature quantity appropriate for detecting an abnormality that may occur in the control target.

The internal DB 130 typically stores raw data 132 collected in the raw data collection (1), learning results 134 obtained in the feature quantity learning (4), and abnormality detection results 136 output in the feature quantity monitoring (5).

The machine learning engine 140 includes the learning function 142 for performing intended processing in the feature quantity learning (4) and the abnormality detection function 144 for performing intended processing in the feature quantity monitoring (5). The learning function 142 performs machine learning using the feature quantity generated by executing the feature quantity generation program 174. The abnormality detection function 144 detects an abnormality in a control target based on the abnormality detection parameters 1546 and the feature quantities generated by executing the feature quantity generation program 174. The abnormality detection parameters 1546 are determined based on the learning results from machine learning implemented by the learning function 142 and used for detecting an abnormality in a control target. When the abnormality detection function 144 detects any abnormality, the abnormality detection function 144 outputs an event log 146 indicating the details of the detected abnormality. The abnormality detection function 144 operates in accordance with the request from the monitoring request program 170. More specifically, the monitoring request program 170 instructs the abnormality detection function 144 to detect an abnormality.

The support apparatus 200 includes the parameter setting tool 224 and the data mining tool 226 installed in addition to the development program 222 (FIG. 3).

The parameter setting tool 224 includes the PLC variable access program 2242 for enabling access to each variable managed by the variable manager 154 in the controller 100. The PLC variable access program 2242 enables reference to and rewriting of variables in the controller 100.

The data mining tool 226 includes an internal DB access function 2262, a data mining function 2264, and a visualization function 2266. The internal DB access function 2262 accesses the internal DB 130 to extract intended data from the raw data collected in the internal DB 130. The data mining function 2264 mainly performs the data mining (2) described above. The visualization function 2266 visually presents various items of information that may be obtained in the data mining (2) and the information about the abnormality detected in the feature quantity monitoring (5) to the user.

The data mining tool 226 determines the feature quantity generation technique and the abnormality detection technique in the data mining (2), determines the abnormality detection parameters through the feature quantity learning (4), and generates the evaluation results of abnormality detection in the evaluation (6).

Figure 6:
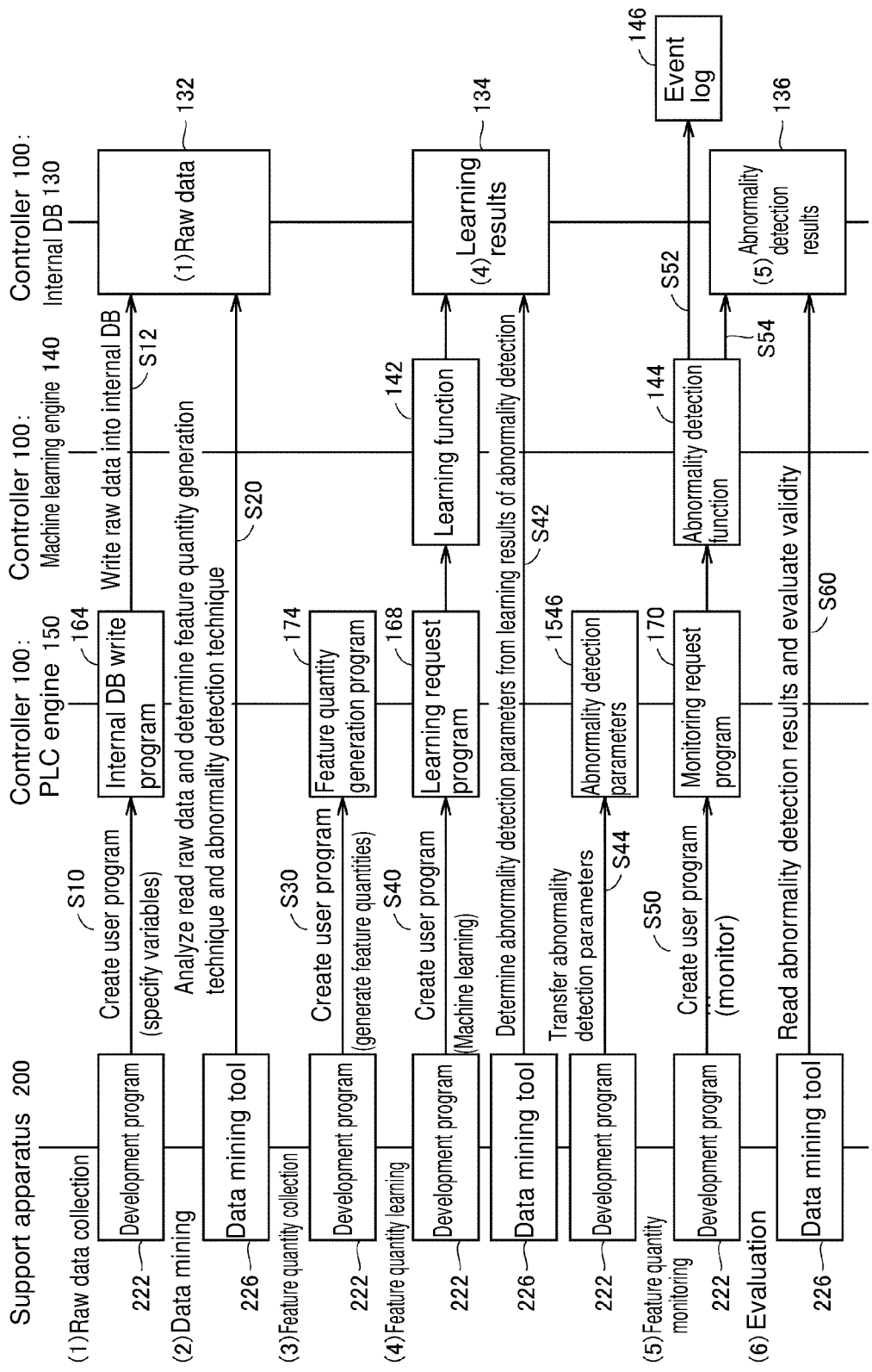
FIG. 6 is a schematic diagram illustrating information about abnormality detection processes performed in a control system according to one or more embodiments.

The relationship between the processes (1) to (6) and the operation of each element shown in FIG. 5 will now be described. FIG. 6 is a schematic diagram describing information about abnormality detection processes performed in the control system 1 according to one or more embodiments.

Referring now to FIG. 6, in the raw data collection (1), the user manipulates the development program 222 in the support apparatus 200 to write a user program for specifying the variables to be collected in the internal DB 130 (step S10). The written user program corresponds to the internal DB write program 164. The internal DB write program 164 is executed in the PLC engine 150 of the controller 100 to write the raw data 132 in the internal DB 130 of the controller 100 (step S12).

In the data mining (2), the user manipulates the data mining tool 226 in the support apparatus 200 to determine the feature quantity generation technique and the abnormality detection technique by reading and analyzing the raw data 132 collected in the internal DB 130 (step S20).

In the feature quantity collection (3), the user manipulates the development program 222 in the support apparatus 200 to write a user program for feature quantity generation reflecting the feature quantity generation technique determined in the data mining (2) (step S30). The written user program corresponds to the feature quantity generation program 174.

In the feature quantity learning (4), the user manipulates the development program 222 in the support apparatus 200 to write a user program for specifying the machine learning using a feature quantity (step S40). The written user program corresponds to the learning request program 168. The learning request program 168 is executed in the machine learning engine interface 166 in the PLC engine 150 of the controller 100 to allow the learning function 142 in the machine learning engine 140 of the controller 100 to perform machine learning. The learning results 134 are stored in the internal DB 130. The feature quantity generation program 174 in the feature quantity collection (3) and the learning request program 168 in the feature quantity learning (4) may be executed simultaneously.

The user then manipulates the data mining tool 226 in the support apparatus 200 to determine the abnormality detection parameters by reading and analyzing the learning results 134 stored in the internal DB 130 (step S42). The user then manipulates the development program 222 in the support apparatus 200 to transfer the determined abnormality detection parameters to the PLC engine 150 in the controller 100 (step S44).

In the feature quantity monitoring (5), the user manipulates the development program 222 in the support apparatus 200 to write a user program for monitoring for any abnormality (step S50). The written user program corresponds to the monitoring request program 170. The monitoring request program 170 is executed in the machine learning engine interface 166 in the PLC engine 150 of the controller 100 to allow the abnormality detection function 144 in the machine learning engine 140 of the controller 100 to perform abnormality detection. When any abnormality is detected, the event log 146 including the information about the abnormality is output (step S52), and the abnormality detection results 136 are written into the internal DB 130 (step S54).

In the evaluation (6), the user manipulates the development program 222 in the support apparatus 200 to read the abnormality detection results 136 stored in the internal DB 130 and evaluate the validity of the read results (step S60). The user may modify the abnormality detection parameters 1546 as appropriate.

The cooperation between these elements of the controller 100 and the support apparatus 200 implements the abnormality detection function according to one or more embodiments.

D. Raw Data Collection

The user program (internal DB write program 164) generated in the raw data collection (1) will now be described.

Figure 7:
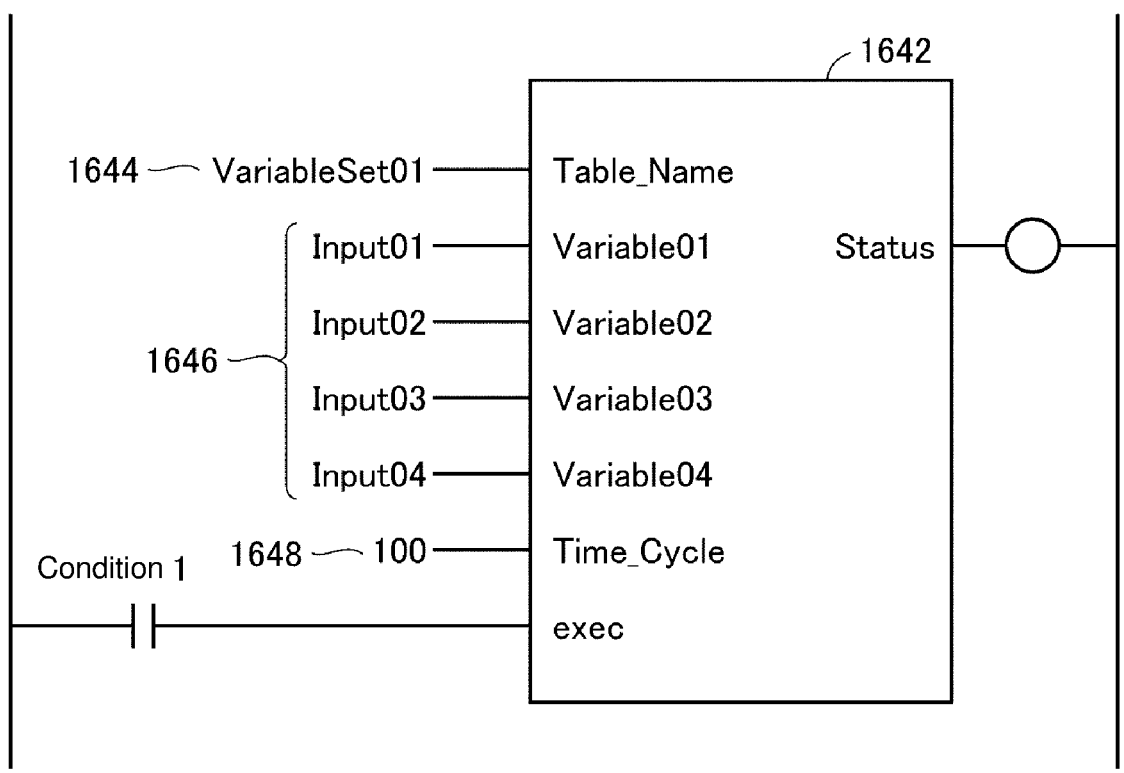
FIG. 7 is a diagram illustrating an internal DB write program generated in a control system according to one or more embodiments.

FIG. 7 shows an example internal DB write program 164 generated in the control system 1 according to one or more embodiments. Referring to FIG. 7, the internal DB write program 164 may be typically written using an internal DB writing function block 1642.

The internal DB writing function block 1642 has assigned information including a table name 1644 for identifying the raw data set collected in the internal DB 130, target variable specification 1646 for specifying the variables collected in the internal DB 130, and cycle specification 1648 for specifying the cycles in which the variables are collected in the internal DB 130.

The user specifies the table name 1644 as any name, and the target variable specification 1646 as the variable identifiers representing target variables. The user also specifies the cycle specification 1648 as the cycles in which the target variables are collected (collection frequency). In the example shown in FIG. 7, four variables (Input01 to Input04) are collected in the table named VariableSet01 in cycles of 100 msec. The conditions may also be specified for effectively operating the internal DB writing function block 1642.

The user program shown in FIG. 7 is a mere example, and may be written in any manner. For example, the user program may be written using ladder language or structured text.

In this manner, the controller 100 includes the internal DB 130 as a database for storing the collected data associated with a control target. The internal DB 130 stores collected data specified in accordance with the instructions in the user program (e.g., the internal DB writing function block 1642).

In the control system 1 according to one or more embodiments, the user simply writes the user program described above (internal DB write program 164) to allow one or more intended chronological variables to be collected in control cycles of the controller 100 (in the orders of hundreds of microseconds to tens of milliseconds). The control system 1 thus enables more precise analysis than systems known in the art.

E. Data Mining

The feature quantity generation technique and the abnormality detection technique determined in the data mining (2) in one example will now be described.

FIG. 8 is a table listing the feature quantities that can be determined in the data mining performed in the control system 1 according to one or more embodiments. The feature quantities shown in FIG. 8 are predefined. In the data mining, the feature quantities to be used for the raw data collected in the internal DB 130 are determined.

More specifically, each feature quantity shown in FIG. 8 is calculated using the raw data collected in the internal DB 130, and the feature quantities having higher degrees of change are determined as candidates.

In some embodiments, typical techniques to be used include various principal component analyses. A known method of principal component analysis may be used.

Figure 9:
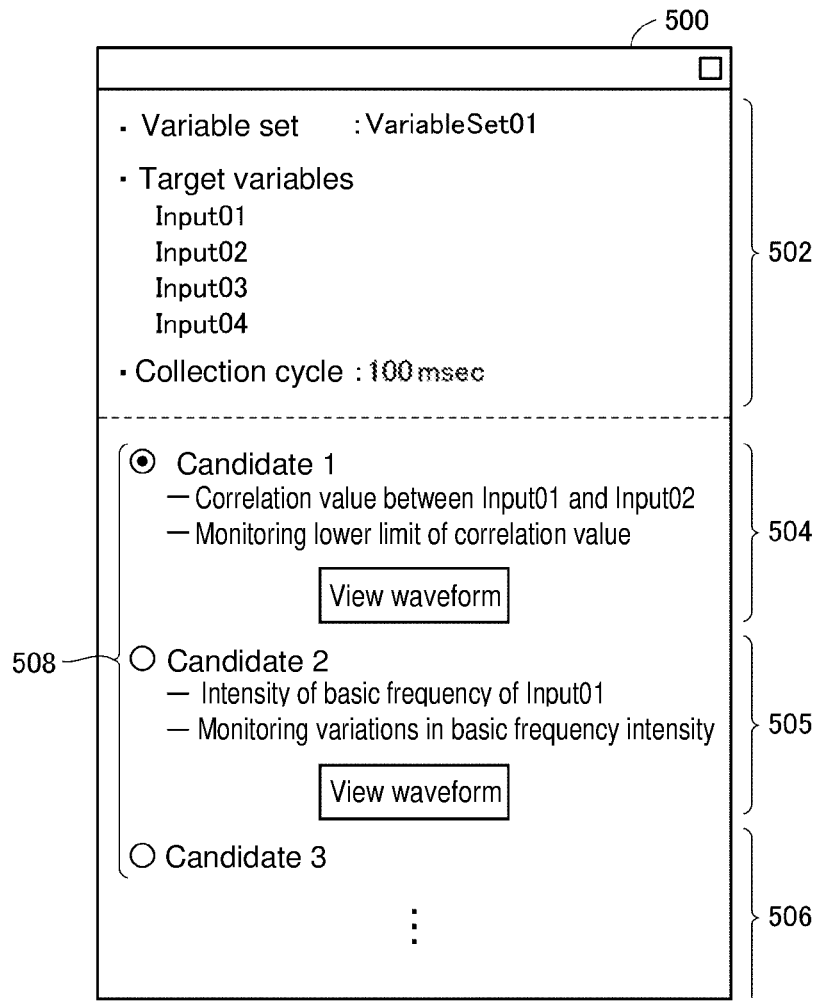
FIG. 9 a diagram illustrating a user interface screen displayed after data mining in a support apparatus according to one or more embodiments.

FIG. 9 shows an example user interface screen displayed after the data mining in the support apparatus 200 according to one or more embodiments. Referring to FIG. 9, a user interface screen 500 displays identification information 502 for identifying the raw data set to undergo data mining, and candidate techniques for the feature quantity generation technique and the abnormality detection technique (candidates 504 to 506) extracted through the data mining.

For each of the candidates 504 to 506, one or more variables used for the feature quantity generation and the type of feature quantity generated using the variables appear in combination. An algorithm for monitoring the generated feature quantity also appears. For example, the candidate 504 has the correlation value between variable Input01 and variable Input02 as a candidate for the feature quantity generation technique (or the feature quantity), and the technique for monitoring the lower limit if the feature quantity as a candidate for the abnormality detection technique. The same applies to the other candidates 505 and 506.

For each of the candidates 504 to 506, a View Waveform button also appears. The user can select this button to view the waveform used to determine the feature quantity generation technique candidate and the abnormality detection technique candidate.

The user finally selects the radio button 508 for the candidate that seems the best on the user interface screen 500. The selection determines the feature quantity generation technique and the abnormality detection technique. In this manner, the data mining tool 226 is executed in the support apparatus 200 to provide the function for determining, based on the data collected in the internal DB 130 of the controller 100, the feature quantity generation technique appropriate for detecting an abnormality that may occur in a control target.

F. Feature Quantity Collection and Feature Quantity Learning

The user programs generated in the feature quantity collection (3) and the feature quantity learning (4) (the feature quantity generation program 174 and the learning request program 168) will now be described.

Figure 10:
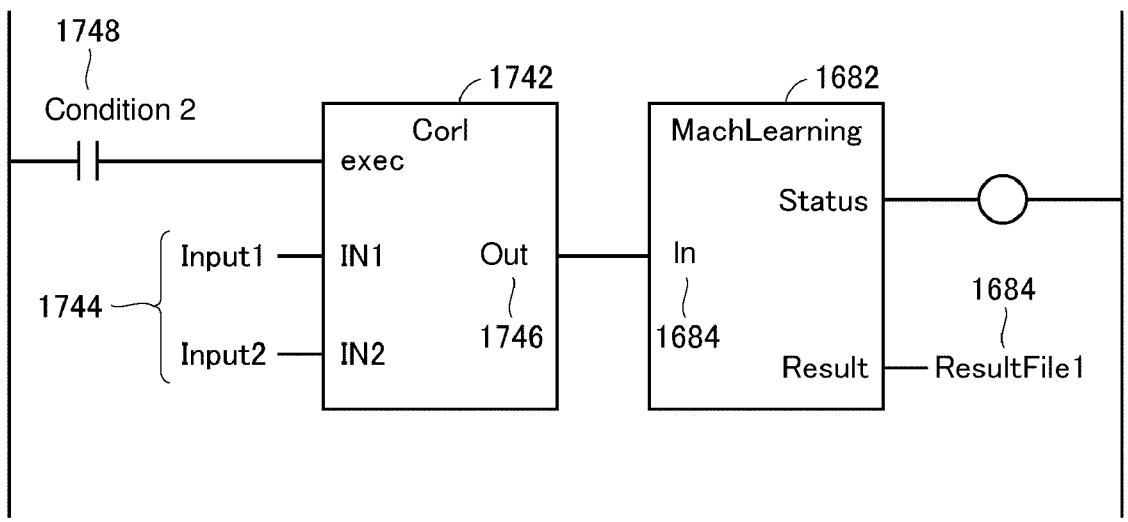
FIG. 10 a diagram illustrating a feature quantity generation program and a learning request program generated in a control system according to one or more embodiments.

FIG. 10 shows an example feature quantity generation program 174 and an example learning request program 168 generated in the control system 1 according to one or more embodiments. Referring now to FIG. 10, the feature quantity generation program 174 may be typically written using a feature quantity generation function block 1742. The feature quantity generation function block 1742 is a functional module for calculating the correlation value as the feature quantity associated with the first candidate in the user interface screen 500 shown in FIG. 9.

The feature quantity generation function block 1742 has assigned information including input variable specification 1344 for specifying the variable used for feature quantity calculation, and output destination specification 1746 for indicating the output destination of the calculated feature quantity. The feature quantity learning (4) intends to determine the abnormality detection parameter used in abnormality detection. A condition 1748 may also be defined for effectively operating the feature quantity generation function block 1742. The condition 1748 can be a variable indicating a situation in which any abnormality may occur in the target equipment and machines under monitoring. For example, the condition 1748 may be the temperature of the target equipment and machines under monitoring exceeding a predetermined value. In some embodiments, the condition 1748 may be the target equipment and machines under monitoring that are actually operating. Setting the condition 1748 reduces the data amount of generated feature quantities, and increases the efficiency and the accuracy of machine learning.

The output end of the feature quantity generation function block 1742 (output destination specification 1746) may be connected to a learning request function block 1682 for performing the processing corresponding to the learning request program 168. More specifically, the output destination specification 1746 of the feature quantity generation function block 1742 is connected to input variable specification 1684 of the learning request function block 1682 for specifying the variable to be the learning target feature quantity.

The information resulting from the machine learning performed by the learning request program 168 (learning results 134) is output to the output end of the learning request function block 1682 (learning result output destination specification 1686).

Figures 11, 12, 13:
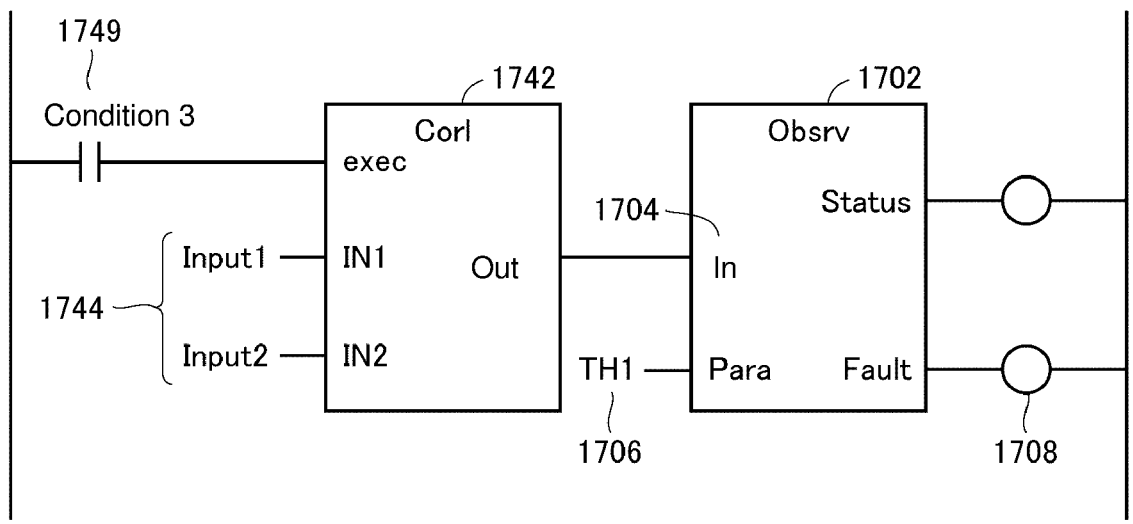
FIG. 11 a diagram illustrating example learning results of machine learning performed in a control system according to one or more embodiments.
FIG. 12 a diagram illustrating a feature quantity generation program and a monitoring request program generated in a control system according to one or more embodiments.
FIG. 13 is a schematic diagram illustrating serialization performed in a controller for a control system according to one or more embodiments.

FIG. 11 shows example learning results of machine learning performed in the control system 1 according to one or more embodiments. In the example shown in FIG. 11, the calculated feature quantity set is divided into three clusters. In this case, the learning results 134 to be output include the identification of each cluster, as well as the number of pieces of data, and the average and the standard deviation of the feature quantity included in each cluster.

Based on the learning results 134 shown in FIG. 11, the user can estimate that the first and third clusters having relatively high correlation values as the feature quantities represent a normal state, and the second cluster having relatively low correlation values as the feature quantities represent an abnormal state. Additionally, a threshold for distinguishing the first and third clusters from the second cluster may be set as an abnormality detection parameter. In this case, the range including fluctuations in each cluster is defined based on the average and the standard deviation in each cluster, and the abnormality detection parameter is determined. For example, the first and second clusters in the example shown in FIG. 11 have a wide gap between them, and thus may have their abnormality detection parameter set at 47.5, which is the intermediate value between the average values of these clusters.

Setting the abnormality detection parameter completes the feature quantity collection (3) and the feature quantity learning (4). In this manner, the data mining tool 226 is executed in the support apparatus 200 to provide the function of determining an abnormality detection parameter 1706 based on the learning results from machine learning.

G. Feature Quantity Monitoring

The user program generated in the feature quantity monitoring (5) (monitoring request program 170) will now be described.

FIG. 12 shows an example feature quantity generation program 174 and an example monitoring request program 170 generated in the control system 1 according to one or more embodiments. As in FIG. 10, the feature quantity generation program 174 is written using a feature quantity generation function block 1742.

The output end of the feature quantity generation function block 1742 (output destination specification 1746) may be connected to a monitoring request function block 1702 for performing the processing corresponding to the monitoring request program 170. More specifically, the output destination specification 1746 of the feature quantity generation function block 1742 is connected to input variable specification 1704 of the monitoring request function block 1702 for specifying the variable to be the monitoring target feature quantity. Additionally, an abnormality detection parameter 1706 as the threshold of abnormality detection is defined for the monitoring request function block 1702.

The feature quantity generation function block 1742 compares the variable (feature quantity) specified in the input variable specification 1704 with the threshold specified as the abnormality detection parameter 1706 in every control cycle. If the threshold is exceeded in the comparison, the feature quantity generation function block 1742 turns on the variable (coil) defined as failure output destination specification 1708. The user program can immediately detect an abnormality in the equipment and machines that are control targets based on the value of the variable specified as the failure output destination specification 1708.

In this manner, the abnormality detection function 144 is implemented by the user program (feature quantity generation function block 1742) including the specification of the abnormality detection parameter 1706 and the specification of the target feature quantity. This function block can be used to define the abnormality detection to increase the versatility.

In the feature quantity monitoring (5), the abnormality detection may be performed when the target equipment and machines are actually operating. In this case, a condition 1749 may be defined for effectively operating the feature quantity generation function block 1742. The condition 1749 may be a variable indicating the equipment and machines under monitoring that are operating. The condition may be defined for effectively operating the monitoring request function block 1702, rather than the feature quantity generation function block 1742. Specifying this condition 1749 can reduce the possibility of erroneous detection of an abnormality in target equipment and machines, and increases the accuracy of the abnormality detection.

The user program described above (monitoring request program 170) allows abnormality detection of target equipment and machines.

H. Serialization Module

The controller 100 included in the control system 1 according to one or more embodiments includes the internal DB 130, which enables faster data collection. To further speed up the data collection, the serialization and deserialization techniques described below may be used. The serialization and deserialization techniques may be provided by the serialization module 172 (FIG. 5).

h1: Data Compression by Serialization

Data compression by serialization will now be described. FIG. 13 is a schematic diagram describing the serialization performed in the controller 100 for the control system 1 according to one or more embodiments. In the example shown in FIG. 13, the data collected in the internal DB 130 is defined by key-value pairs. More specifically, the target input data is defined by sets of a key indicating the meaning of a value and an actual value. In this case, the serialization module 172 serializes the input data, which also includes redundant information, to reduce the data amount (or compress the data).

In one example, the data included in the input data may be divided into data units, and each data unit may be compacted into a data piece that represents the corresponding data unit. In some embodiments, the input data may be converted into machine code that can be directly interpreted by the processor 102 as shown in FIG. 13. More specifically, the serialization module 172 may implement data compression by converting target data into machine code.

The conversion into the machine code reduces the redundancy of the original input data. The machine learning engine 140, which can directly interpret compressed input data, may use the compressed input data in machine learning.

In this manner, the data compression performed before data is written in the internal DB 130 increases the speed of access to the internal DB 130.

h2: Speedup of Deserialization

When the serialized data stored in the internal DB 130 is accessed, conversion reverse to serialization, which is deserialization, is to be performed. The deserialization may also be speeded up in the manner described below.

Figure 14:
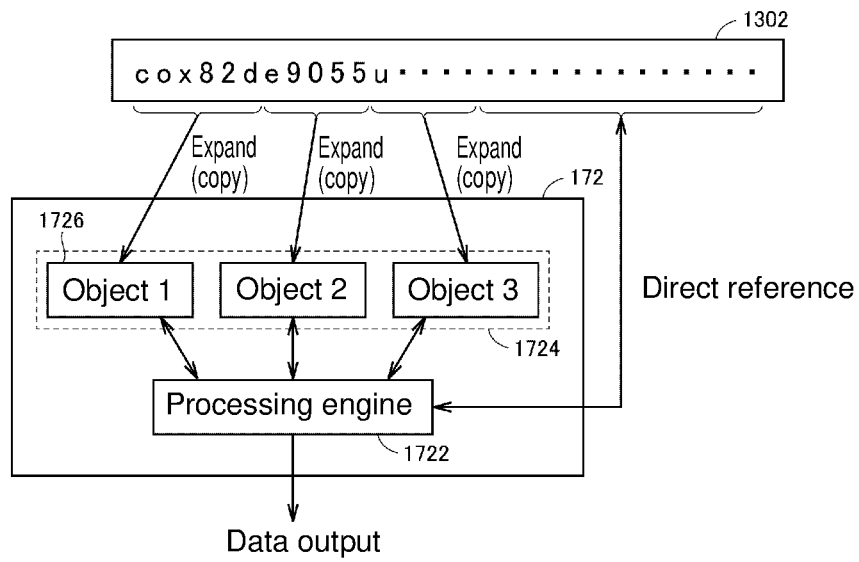
FIG. 14 is a schematic diagram illustrating deserialization performed in a controller for a control system according to one or more embodiments.

FIG. 14 is a schematic diagram describing the deserialization performed in the controller 100 for the control system 1 according to one or more embodiments. In the example shown in FIG. 14, intended target data 1302 is read from the internal DB 130. The target data 1302 has been serialized, and the entire target data 1302 is usually to be deserialized.

In the controller 100 according to one or more embodiments, a processing engine 1722 in the serialization module 172 copies pieces of data included in the target data 1302 into a buffer area 1724 to generate, in the buffer area 1724, one or more objects 1726 to be used to deserialize the target data 1302. Subsequently, the processing engine 1722 in the serialization module 172 referring to the one or more generated objects 1726 outputs the deserialized results of the remaining target data 1302 without copying the remaining target data 1302 into the buffer area 1724.

In this manner, the deserialization is completed by copying only some pieces of target data, rather than reading and temporarily copying the entire serialized data. This enables faster reading.

I. Directly Writing Data Through Machine Learning Engine Interface

Figure 15A:
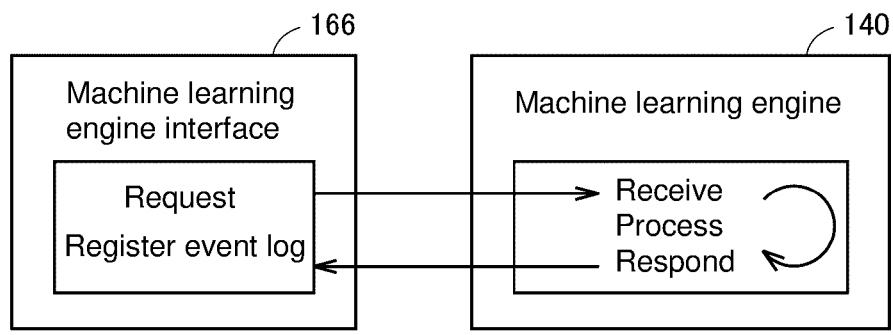
FIGS. 15A and 15B are schematic diagrams illustrating data communication between a machine learning engine interface and a machine learning engine included in a controller for a control system according to one or more embodiments.
Figure 15B:
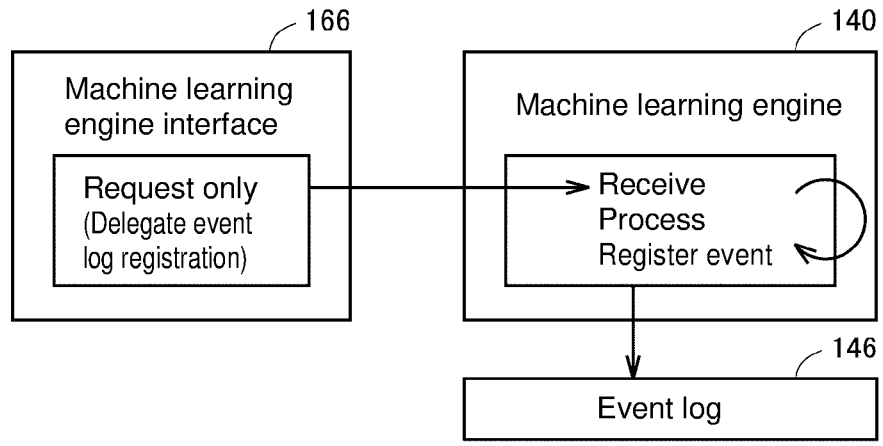

Data communication between the machine learning engine interface 166 and the machine learning engine 140 will now be described. FIGS. 15A and 15B are schematic diagrams describing data communication between the machine learning engine interface 166 and the machine learning engine 140 included in the controller 100 for the control system 1 according to one or more embodiments.

FIG. 15A shows typical data communication in a server-client model. In this model, when the machine learning engine interface 166 transmits a request to the machine learning engine 140, the machine learning engine 140 receives and processes the request, and responds using the obtained processing results. The machine learning engine interface 166 then receives the response from the machine learning engine 140, and registers an event log.

In this model, which involves transmitting a request and waiting for a response to the request before processing, the machine learning engine interface 166 cannot perform the next processing until the response is received and thus suspends the processing.

In contrast, the controller 100 according to one or more embodiments reduces the response time waited by the machine learning engine interface 166 by delegating the request response processing (event log registration in this example) from the machine learning engine interface 166 to the machine learning engine 140 as shown in FIG. 15B. More specifically, the machine learning engine interface 166 in the model shown in FIG. 15B simply transmits a request to the machine learning engine 140. Subsequently, the machine learning engine 140 receives and processes the request from the machine learning engine interface 166, and registers the processing results in the event log 146.

In this manner, the machine learning engine interface 166 may simply transmit an intended request to the machine learning engine 140, and can proceed with the subsequent processing without waiting for a response or any other processing. More specifically, the machine learning engine interface 166 transmits an intended request for abnormality detection to the abnormality detection function 144. The abnormality detection function 144 then performs abnormality detection without returning a response to the request to the machine learning engine interface 166.

This model enables faster data communication between the machine learning engine interface 166 and the machine learning engine 140. More specifically, the processing of the machine learning engine interface 166 and the processing of the machine learning engine 140 can be performed asynchronously. This shortens the processing waiting time of the machine learning engine interface 166.

J. Applications

The control system 1 according to one or more embodiments has applications described below.

Figure 16:
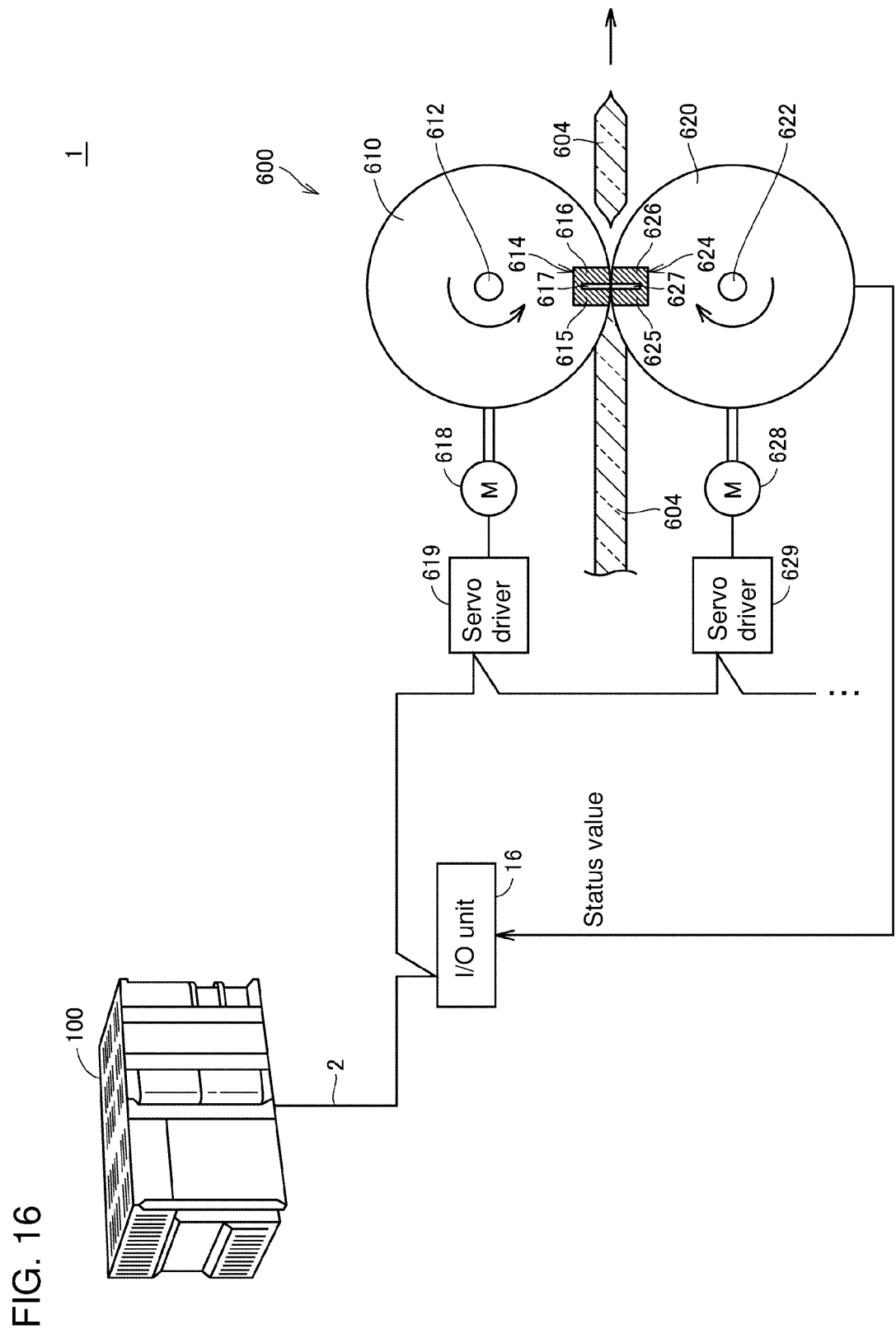
FIG. 16 is a schematic diagram illustrating one application of a control system according to one or more embodiments.

FIG. 16 is a schematic diagram showing one application of the control system 1 according to one or more embodiments. FIG. 16 shows an example of the control system 1 including a packaging machine 600.

Referring now to FIG. 16, a package 604 is being transported in a predetermined transportation direction. The packaging machine 600 sequentially seals and/or cuts the package 604 with rotors. The packaging machine 600 includes a pair of rotors 610 and 620, which rotate in synchronization with each other. Each rotor is arranged to have the tangent line to the circumference at a point in contact with the package 604 being aligned with the transportation direction. Each rotor includes heaters and a cutter arranged at predetermined positions. When the heaters and the cutter come into contact with the package 604, the package 604 is sealed and cut.

The rotors 610 and 620 in the packaging machine 600 are driven by servomotors 618 and 628 to rotate about rotational shafts 612 and 622 in synchronization with each other. The rotors 610 and 620 include processing mechanisms 614 and 624 on their respective surfaces. The processing mechanism 614 includes front and rear heaters 615 and 616 arranged circumferentially (in the rotation direction), and a cutter 617 arranged between the heaters 615 and 616. Similarly, the processing mechanism 624 includes front and rear heaters 625 and 626 arranged circumferentially, and a cutter 627 arranged between the heaters 625 and 626. The rotors 610 and 620 include the cutters 617 and 627 on their outer peripheral surfaces for cutting the package 604.

When the rotors 610 and 620 rotate in synchronization with the transportation speed of the package 604, the heaters 615 and 625 seal (bond) the opposite surfaces (upper and lower surfaces) at the right edge of the package 604, and the heaters 616 and 626 seal (bond) the opposite surfaces (upper and lower surfaces) at the left edge of the package 604. In parallel with the sealing, the cutters 617 and 627 cut the package 604. The processing is repeated to repeatedly seal and cut the package 604 including packaged articles 605, and to sequentially produce individual packages 606.

The rotational speed and the torque of the servomotors 618 and 628, which rotate the rotors 610 and 620, are controlled by servo drivers 619 and 629, which are examples of drivers (driving devices). The controller 100 can collect the status values of the servomotors 618 and 628, or the actual values of the rotors 610 and 620, from the servo drivers 619 and 629. Examples of the status values of the servo drivers 619 and 629 (or the actual values of the rotors 610 and 620) include (1) a rotational position (phase/rotation angle), (2) a speed, (3) an acceleration, (4) a torque value, (5) a current value, and (6) a voltage value.

The controller 100 detects foreign matter being caught using the status values of the servo drivers 619 and 629 (or the rotors 610 and 620).

Foreign matter may be caught due to misalignment of the package 604 or misalignment of a packaged article 605 contained in the package 604. When foreign matter is caught, a larger torque is produced from the servomotors 618 and 628, which rotate the rotors 610 and 620. Monitoring such changes in the torque allows detection of an abnormality, or foreign matter being caught.

Figure 17A:
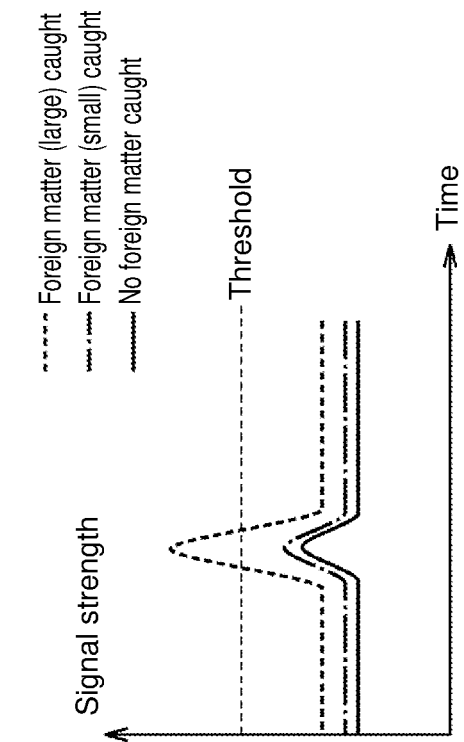
FIGS. 17A and 17B are diagrams illustrating example changes in the status values observed when foreign matter is caught in a control system, such as in FIG. 16, and example changes in the feature quantities generated from the status values.
Figure 17B:
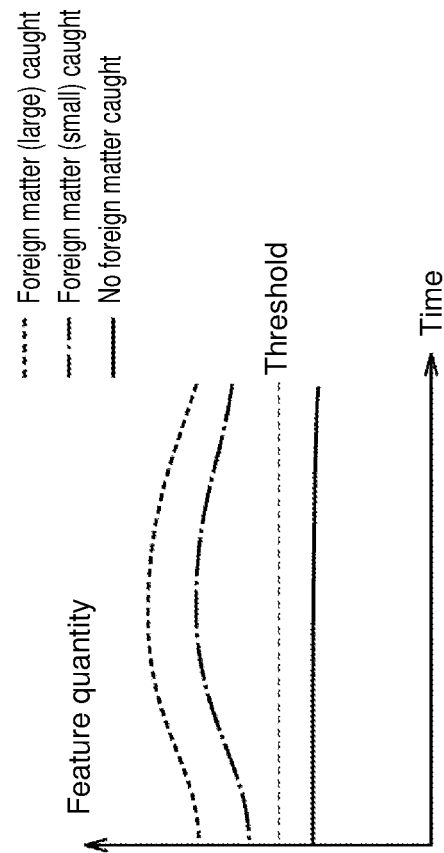

FIGS. 17A and 17B show example changes in the status values observed when foreign matter is caught in the control system 1 shown in FIG. 16, and example changes in the feature quantities generated from the status values. FIG. 17A shows example time-varying changes in the signal strength associated with the force produced from the rotors 610 and 620. In the example time-varying changes in the signal strength shown in FIG. 17A, when a relatively large piece of foreign matter is caught, the signal strength changes greatly and exceeds a predetermined threshold. This allows detection of the abnormality.

In contrast, when a relatively small piece of foreign matter is caught, the signal strength changes slightly and does not reach the predetermined threshold. Thus, this abnormality, or a relatively small piece of foreign matter being caught, cannot be detected.

The abnormality detection function provided by the control system 1 according to one or more embodiments sets an appropriate feature quantity and an appropriate abnormality detection parameter, and thus can detect an abnormality that cannot be detected by directly observing the torque from the rotors.

In one example, the feature quantity shown in FIG. 17B can be used to allow an abnormality of a relatively small piece of foreign matter being caught to be sufficiently distinguishable from a normal state with no foreign matter being caught.

The threshold (abnormality detection parameter) set between the feature quantity in the normal state and the feature quantity in the state with a relatively small piece of foreign matter being caught enables detection of an abnormality of even a relative small piece of foreign matter being caught.

K. Modifications

All or some of the functions of the support apparatus 200 described above may be incorporated in the controller 100. For example, the data mining tool 226 implemented in the support apparatus 200 may be implemented in the controller 100. This configuration allows the functions according to one or more embodiments to be used without many application programs installed in the support apparatus 200.

In addition, the module configurations shown in FIGS. 5 and 6 are mere examples, and may have any configurations that can provide the functions described above. For example, a single functional module shown in FIGS. 5 and 6 may be implemented as a set of multiple functional modules or multiple functional modules shown in FIGS. 5 and 6 may be implemented as a single module depending on the limitations on hardware or programming.

L. Advantages

The control system according to one or more embodiments includes the controller that transmits and receives data to and from the field, and the controller has the database for collecting data. The data collected in the database is used for machine learning, and the results of the machine learning are used to detect an abnormality. This highly functional controller provides a technique for enabling shorter-cycle monitoring of a phenomenon occurring in a control target than configurations known in the art.

The embodiments disclosed herein are only illustrative in all respects and should not be construed to be restrictive. The scope of the present invention is determined not by the description given above but by the claims, and is construed as including any modification that comes within the meaning and range of equivalency of the claims.

REFERENCE SIGNS LIST

1 control system
2 first field network
4 second field network
6 local network
10 field device group
12 remote I/O device
14 relay group
16, 124 I/O unit
18 image sensor
20 camera
22, 619, 629 servo driver
24, 618, 628 servomotor
100 controller
102, 202 processor
104 chipset
106, 206 main storage
108, 208 secondary storage
110, 214 local network controller
112, 212 USB controller
114 memory card interface
116 memory card
118, 120 fieldbus controller
122 internal bus controller
130 internal DB
132 raw data
134 learning results
136 abnormality detection results
140 machine learning engine
142 learning function
144 abnormality detection function
146 event log
150 PLC engine
152 scheduler
154 variable manager
160 control program
162 sequence/motion program
164 internal DB write program
166 machine learning engine interface
168 learning request program
170 monitoring request program
172 serialization module
174 feature quantity generation program
190 OS
200 support apparatus
204 optical drive
205 recording medium
216 input unit
218 display unit
220 bus
222 development program
224 parameter setting tool
226 data mining tool
300 data logging device
400 display
500 user interface screen
502 identification information
504, 505, 506 candidate
508 radio button
600 packaging machine
604 package
605 packaged article
606 individual package
610 rotor
612 rotational shaft
614, 624 processing mechanism
615, 616, 625, 626 heater
617, 627 cutter
1302 target data
1344, 1684, 1704 input variable specification
1542 system variable
1544 device variable
1546, 1706 abnormality detection parameter
1642 writing function block
1644 table name
1646 target variable specification
1648 cycle specification
1682 learning request function block
1686 learning result output destination specification
1702 monitoring request function block
1708 failure output destination specification
1722 processing engine
1724 buffer area 1726 object
1742 feature quantity generation function block
1746 output destination specification
1748, 1749 condition
2242 variable access program
2262 access function
2264 data mining function
2266 visualization function

The invention claimed is:

1. A control method used by a controller for controlling a control target, the method comprising:
generating, from data associated with the control target, a feature quantity appropriate for detecting an abnormality in the control target;
performing machine learning using the generated feature quantity;
detecting the abnormality in the control target based on an abnormality detection parameter determined from a learning result of the machine learning used for detecting the abnormality, and based on the generated feature quantity;
and
compressing data about the generated feature quantity and providing the data used for the machine learning and the abnormality detection,
wherein detecting the abnormality includes detecting the abnormality without returning a response to a transmitted request for detecting the abnormality.

2. A non-transitory computer-readable storage medium storing a control program executable by a computer to implement a controller for controlling a control target, the program causing the computer to perform operations comprising:
generating, from data associated with the control target, a feature quantity appropriate for detecting an abnormality in the control target;
performing machine learning using the generated feature quantity;
detecting the abnormality in the control target based on an abnormality detection parameter determined from a learning result of the machine learning used for detecting the abnormality, and based on the generated feature quantity;
and
compressing data about the generated feature quantity and providing the data used for the machine learning and the abnormality detection,
wherein detecting the abnormality includes detecting the abnormality without returning a response to a transmitted request for detecting the abnormality.

3. A controller for controlling a control target, the controller comprising a processor configured with a program to perform operations comprising:
operation as a feature quantity generation unit configured to generate, from data associated with the control target, a feature quantity appropriate for detecting an abnormality in the control target;
operation as a machine learning unit configured to perform machine learning using the feature quantity generated by the feature quantity generation unit;
operation as an abnormality detection unit configured to detect the abnormality in the control target based on an abnormality detection parameter determined from a learning result of the machine learning used for detecting the abnormality, and based on the feature quantity generated by the feature quantity generation unit;

operation as an instruction unit configured to instruct the abnormality detection unit to detect the abnormality; and
operation as a data compression unit configured to compress data about the feature quantity generated by the feature quantity generation unit and provide the compressed data to the machine learning unit and the abnormality detection unit,
wherein the processor is configured with the program such that operation as the instruction unit comprises transmitting a request for detecting the abnormality to the abnormality detection unit, and the abnormality detection unit detects the abnormality without returning a response to the request to the instruction unit.

4. The controller according to claim 3, wherein
the processor is configured with the program such that operation as the data compression unit comprises converting target data into machine code.

5. The controller according to claim 4, wherein
the processor is configured with the program such that the abnormality detection unit is implemented by a user program including specification of the abnormality detection parameter and specification of the target feature quantity.

6. The controller according to claim 5, further comprising:
a database configured to collect and store data associated with the control target.

7. The controller according to claim 6, wherein
the database stores data specified in accordance with an instruction included in a user program.

8. The controller according to claim 4, further comprising:
a database configured to collect and store data associated with the control target.

9. The controller according to claim 8, wherein
the database stores data specified in accordance with an instruction included in a user program.

10. The controller according to claim 3, wherein
the processor is configured with the program such that the abnormality detection unit is implemented by a user program including specification of the abnormality detection parameter and specification of the target feature quantity.

11. The controller according to claim 10, further comprising:
a database configured to collect and store data associated with the control target.

12. The controller according to claim 11, wherein
the database stores data specified in accordance with an instruction included in a user program.

13. The controller according to claim 3, further comprising:
a database configured to collect and store data associated with the control target.

14. The controller according to claim 13, wherein
the database stores data specified in accordance with an instruction included in a user program.

15. The controller according to claim 13, wherein the processor is configured with the program to perform operations further comprising:
operation as a determination unit configured to determine, based on the data stored in the database, a feature quantity generation technique appropriate for detecting the abnormality in the control target.

16. The controller according to claim 3, wherein the processor is configured with the program to perform operations further comprising:

operation as an abnormality detection parameter determination unit configured to determine the abnormality detection parameter based on the learning result of the machine learning.

17. The controller according to claim 3, wherein the processor is configured with the program to perform operations further comprising:

operation as a storing unit configured to store the abnormality detection parameter, and update the stored abnormality detection parameter in response to a request from an external device.

\* \* \* \* \*